US012807133B2

(12) United States Patent
Lee

(10) Patent No.: US 12,807,133 B2
(45) Date of Patent: Nov. 24, 2026

(54) AUTONOMOUS DRIVING VEHICLE AND CONTROL METHOD THEREOF

(71) Applicants: Hyundai Motor Company, Seoul (KR); Kia Corporation, Seoul (KR)

(72) Inventor: Yang Song Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 40 days.

(21) Appl. No.: 18/918,327

(22) Filed: Oct. 17, 2024

(65) Prior Publication Data

US 2025/0128701 A1 Apr. 24, 2025

(30) Foreign Application Priority Data

Oct. 20, 2023 (KR) ........................ 10-2023-0141283

(51) Int. Cl.

*B60W 30/06* (2006.01)
*B60W 50/00* (2006.01)
*B60W 60/00* (2020.01)

(52) U.S. Cl.

CPC ........ *B60W 30/06* (2013.01); *B60W 50/0097* (2013.01); *B60W 60/001* (2020.02); *B60W 2556/45* (2020.02); *B60W 2756/10* (2020.02)

(58) Field of Classification Search

CPC ............. B60W 30/06; B60W 2556/45; B60W 2756/10; B62D 15/0285; B60R 2325/101
See application file for complete search history.

(56) References Cited

U.S. PATENT DOCUMENTS

2014/0244073 A1* 8/2014 Okamura ............... G05D 1/021 701/2
2015/0045991 A1* 2/2015 Schwitters ............ B60W 30/06 701/2
2017/0197636 A1* 7/2017 Beauvais .............. B60R 25/257
2018/0029642 A1* 2/2018 Mayer ................ B62D 15/0285
2018/0056938 A1* 3/2018 Shin ......................... B60R 25/24
2020/0086851 A1* 3/2020 Krekel ...................... B62D 1/00
2020/0298835 A1* 9/2020 Suzuki ................. G05D 1/0044
2023/0073436 A1* 3/2023 Kent ...................... B60R 25/245
2023/0373437 A1* 11/2023 Baruco ................. B60R 25/305
2025/0206260 A1* 6/2025 Noguchi ................. E05F 15/40

* cited by examiner

*Primary Examiner* — Anshul Sood
(74) *Attorney, Agent, or Firm* — Slater Matsil, LLP

(57) ABSTRACT

A method of controlling an autonomous vehicle can include, under the control of a processor and in response to an approach signal being received through a communication module, activating a driver parking assist function, when the driver parking assist function is activated, detecting a surrounding situation of the autonomous vehicle using a sensor and determining whether a load space at the autonomous vehicle is accessible, and moving the autonomous vehicle in response to a determination that the load space is inaccessible.

20 Claims, 7 Drawing Sheets

AUTONOMOUS DRIVING VEHICLE AND CONTROL METHOD THEREOF

CROSS-REFERENCE TO RELATED APPLICATIONS

This application claims the benefit of Korean Patent Application No. 10-2023-0141283, filed on Oct. 20, 2023, which is hereby incorporated by reference as if fully set forth herein.

TECHNICAL FIELD

The present disclosure relates to an autonomous vehicle and a control method thereof.

BACKGROUND

A typical smart trunk or tailgate is opened based on the approach of a user to a vehicle.

Due to the nature of domestic shopping malls, a great number of vehicles are densely parked in a parking lot, and therefore it may not be easy to approach a trunk or tailgate while carrying a cart with shopped items and load the shopped items into the trunk or tailgate in such a situation.

For example, a driver needs to take out the items one by one from the cart and carry them with hands or needs to drive their vehicle from a parked location toward an access road to reach the cart.

SUMMARY

An embodiment of the present disclosure can provide an autonomous vehicle and a control method thereof that may detect a surrounding parking situation of a driver and a vehicle in a complex parking space and control the vehicle based on the detected situation to provide loading convenience.

According to an embodiment of the present disclosure, in a method of controlling an autonomous vehicle including a processor, the method can include, under the control of the processor and based on a determination of an approach signal being received through a communication module, activating a driver parking assist function, based on a determination that the driver parking assist function is activated, detecting a surrounding situation of the autonomous vehicle using a sensor and determining whether it is accessible to a load space, and moving the autonomous vehicle based on a determination that it is inaccessible to the load space as a result of the determining.

In at least one embodiment of the present disclosure, the activating a driver parking assist function can include, based on the determination of the approach signal being received, activating the processor in a low-power state or a sleep state, and activating, by the activated processor, the driver parking assist function.

In at least one embodiment of the present disclosure, the method may further include, under the control of the processor and after the driver parking assist function is activated, detecting the surrounding situation of the autonomous vehicle and generating sensor information, using the sensor, determining whether there is a vehicle parked on left and right sides of the autonomous vehicle relative to the autonomous vehicle, by analyzing the sensor information, and based on a determination that there is no vehicle parked on the left and right sides of the autonomous vehicle, not providing feedback to a user or not controlling a departure of the autonomous vehicle.

In at least one embodiment of the present disclosure, the method may further include, under the control of the processor and based on a determination of the presence of the vehicle parked on the left and right sides of the autonomous vehicle, determining whether it is accessible to a space behind the autonomous vehicle, and based on a determination of the presence of the space behind the autonomous vehicle, not providing feedback to the user or not controlling the departure of the autonomous vehicle.

In at least one embodiment of the present disclosure, the method may further include, under the control of the processor and based on a determination that it is inaccessible to the space behind the autonomous vehicle, controlling the departure of the autonomous vehicle.

In at least one embodiment of the present disclosure, the method may include, under the control of the processor and based on a determination of a door/trunk/tailgate unlock signal not being received from a digital key or smart key for a predetermined period of time, controlling the departure of the autonomous vehicle after the predetermined period of time elapses.

In at least one embodiment of the present disclosure, the method may include, under the control of the processor and based on a determination of a connection between Bluetooth of the autonomous vehicle and a smart device owned by the user, determining that the user is within a detection range and controlling the departure of the autonomous vehicle.

In at least one embodiment of the present disclosure, the method may include, under the control of the processor, controlling a departure method for the autonomous vehicle differently based on a smart depart function installed on the autonomous vehicle.

In at least one embodiment of the present disclosure, the method may include, under the control of the processor, generating the sensor information by detecting the surrounding situation of the autonomous vehicle using the sensor, and predicting a current location of the user, a distance between the user and the autonomous vehicle, and an estimated arrival time at which the user arrives at the autonomous vehicle by analyzing the sensor information and the approach signal.

To solve the preceding technical problems, according to an embodiment of the present disclosure, there can be provided a computer-readable recording medium storing a program for executing the method of controlling the autonomous vehicle.

To solve the preceding technical problems, according to an embodiment of the present disclosure, there can be provided an autonomous vehicle including a processor, wherein the processor is configured to, based on a determination of an approach signal being received through a communication module, activate a driver parking assist function, based on a determination that the driver parking assist function is activated, detect a surrounding situation of the autonomous vehicle using a sensor and determine whether it is accessible to a load space, and move the autonomous vehicle based on a determination that it is inaccessible to the load space as a result of the determining.

In a vehicle of at least one embodiment of the present disclosure, upon receiving the approach signal, the processor, which can be in a low-power state or a sleep state, may be activated, and the driver parking assist function may be activated by the activated processor.

In a vehicle of at least one embodiment of the present disclosure, the processor may be configured to, after the driver parking assist function is activated, detect the surrounding situation of the autonomous vehicle and generate sensor information, using the sensor, determine whether there is a vehicle parked on left and right sides of the autonomous vehicle relative to the autonomous vehicle, by analyzing the sensor information, and based on a determination that there is no vehicle parked on the left and right sides of the autonomous vehicle, not provide feedback to a user or not control a departure of the autonomous vehicle.

In a vehicle of at least one embodiment of the present disclosure, the processor may be configured to, based on a determination of the presence of the vehicle parked on the left and right sides of the autonomous vehicle, determine whether it is accessible to a space behind the autonomous vehicle, and based on a determination of the presence of the space behind the autonomous vehicle, not provide feedback to the user or not control the departure of the vehicle.

In a vehicle of at least one embodiment of the present disclosure, the processor may be configured to, based on the determination that it is inaccessible to the space behind the autonomous vehicle, control the departure of the autonomous vehicle.

In a vehicle of at least one embodiment of the present disclosure, the processor may be configured to, based on a determination of a door/trunk/tailgate unlock signal not being received from a digital key or smart key for a predetermined period of time, control the departure of the autonomous vehicle after the predetermined period of time elapses.

In a vehicle of at least one embodiment of the present disclosure, the processor may be configured to, based on a determination of a connection between Bluetooth of the autonomous vehicle and a smart device owned by the user, determine that the user is within a detection range and control the departure of the autonomous vehicle.

In a vehicle of at least one embodiment of the present disclosure, the processor may be configured to control a departure method for the autonomous vehicle differently based on a smart depart function installed on the autonomous vehicle.

In a vehicle of at least one embodiment of the present disclosure, the processor may be configured to generate the sensor information by detecting the surrounding situation of the autonomous vehicle using the sensor, predict a current location of the user, a distance between the user and the autonomous vehicle, and an estimated arrival time at which the user arrives at the autonomous vehicle by analyzing the sensor information and the approach signal.

The autonomous vehicle and the control method thereof, configured as described above, may improve an additional product value without increasing the cost because the linkage of parts for a remote smart parking assist (RSPA) function and a control period operates the function without additional separate hardware (H/W).

Further, the autonomous vehicle and the control method thereof, configured as described above, may assist drivers who have difficulty parking and departing the vehicle and feel pressure in loading shopped items, in departing and loading more easily.

Further, the autonomous vehicle and the control method thereof, configured as described above, may select whether to remotely depart the vehicle based on a location of a driver and a surrounding situation of a parked vehicle and operate a smart trunk/smart tailgate after the remote departure, thereby improving the convenience in departing and loading.

The advantages that can be achieved from an embodiment of the present disclosure are not necessarily limited to those described above, and other advantages not described above may also be understood by those skilled in the art from the following description.

DETAILED DESCRIPTION OF ILLUSTRATIVE EMBODIMENTS

Figure 1:
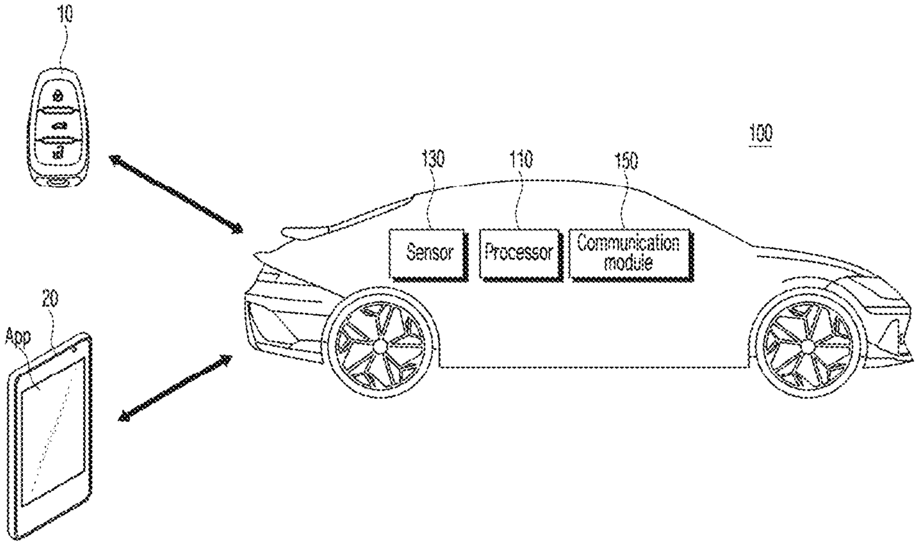
FIG. 1 is a block diagram illustrating an autonomous vehicle according to an embodiment of the present disclosure.

Hereinafter, example embodiments of the present disclosure will be described in detail with reference to the accompanying drawings, and same or similar elements can be given same reference numerals regardless of reference symbols, and a repeated description thereof can be omitted. Further, when describing the example embodiments, when it is determined that a detailed description of related publicly known technology can obscure the gist of the embodiments described herein, the detailed description thereof can be omitted.

As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

The terms "unit" and "control unit" included in names such as a vehicle control unit (VCU) may be terms widely used in the naming of a control device or controller configured to control vehicle-specific functions but may not be a term that represents a generic function unit. For example, each controller or control unit may include a communication device that communicates with other controllers or sensors to control a corresponding function, a memory that stores an operating system (OS) or logic commands and input/output information, and at least one vehicle controller that performs determination, calculation, selection, or the like necessary to control the function. The vehicle controller may also be referred to herein as a drive controller.

FIG. 1 is a block diagram illustrating an autonomous vehicle according to an embodiment of the present disclosure.

Referring to FIG. 1, according to an embodiment, an autonomous vehicle 100 may include a processor 110, a sensor 130, and a communication module 150, any combination of or all of which may be in plural or may include plural components thereof.

When an approach signal is received through the communication module 150, the processor 110 may activate a driver parking assist function. When the driver parking assist function is activated, the processor 110 may detect a surrounding situation of the autonomous vehicle 100 using the sensor 130 to determine whether it is accessible to a load space and may control a movement of the autonomous vehicle 100 based on a result of the determination.

When the start of the autonomous vehicle 100 is turned off, the processor 110 may operate with low power or minimal power in conjunction with the communication module 150, and when the approach signal is received through the communication module 150, may be activated in conjunction with the communication module 150.

The processor 110 may analyze sensor information provided by the sensor 130 and, in response to a determination that it is accessible to the load space as a result of the analysis, may maintain a current parked state without moving the autonomous vehicle 100. In this case, the processor 110 may track the received approach signal to predict a location of the driver and may control a trunk or tailgate to open based on the predicted location of the driver.

In contrast, the processor 110 may analyze the sensor information provided by the sensor 130 and, in response to a determination that it is inaccessible to the load space as the result of the analysis, may move the autonomous vehicle 100. That is, the processor 110 may remotely depart the autonomous vehicle 100. The processor 110 may track the received approach signal to predict the location of the driver and may remotely depart the autonomous vehicle 100 based on the predicted location of the driver.

The processor 110 may move the autonomous vehicle 100 to a space accessible to the load space based on the predicted location of the driver. This will be described in more detail below.

The processor 110 may include an integrated body unit (IBU), a body control unit (BDC), an integrated vehicle wired/wireless communication connectivity control unit (CCU), or the like. For example, the vehicle wired/wireless communication CCU may be connected by wire inside the autonomous vehicle 100 and connected wirelessly outside the autonomous vehicle 100 to control vehicle software updates, connected car services, vehicle data collection, high-speed over-the-air (OTA) delivery of remote vehicle diagnostics, or the like.

The sensor 130 may be provided as one or more sensors in the autonomous vehicle 100 and may sense the surrounding situation of the autonomous vehicle 100. For example, the sensor 130 may be provided as at least one sensor at each of the front, rear, and sides of the autonomous vehicle 100 to sense or detect, in real time, the autonomous vehicle 100 being parked, the surrounding situation of the autonomous vehicle 100, and a surrounding environment when the driver parking assist function is activated, and provide the sensor information to the processor 110. The sensor 130 may include, for example, an ultrasonic sensor, a camera, a lidar, a radar, or the like.

For example, in the case of a remote departure of the autonomous vehicle 100, the sensor 130 may sense the surrounding situation (e.g., whether the autonomous vehicle 100 is parked nearby) necessary for the departure, under the control of the processor 110. This will be described in more detail below.

The communication module 150 may be provided as one or more communication modules in the autonomous vehicle 100, and may receive the approach signal and provide the received approach signal to the processor 110. The communication module 150 may include, for example, a telematics service, a wireless communication service, a controller area network (CAN) communication service, or the like.

For example, the communication module 150 may transmit and receive predetermined signals to and from a digital key, a smart key 10, or an application (or app) installed on a smart device 20. The predetermined signals may include an approach signal, a surrounding situation signal, a response signal, an authentication response signal, a request signal, an authentication request signal, or the like.

For example, the communication module 150 may receive a predetermined signal from the digital key, the smart key 10, or the app installed on the smart device 20 and may provide the received signal to the processor 110, or may receive a predetermined signal from the processor 110 and transmit the signal to the digital key, the smart key 10, or the app installed on the smart device 20.

The digital key and the smart key 10 may be referred to as a key fob. For example, the key fob or the smart device 20 may be portable and wirelessly communicate with the autonomous vehicle 100.

For example, when the driver carrying the smart key 10 approaches the autonomous vehicle 100, low frequency (LF) communication and radio frequency (RF) communication with the smart key 10 may be performed.

Figure 2:
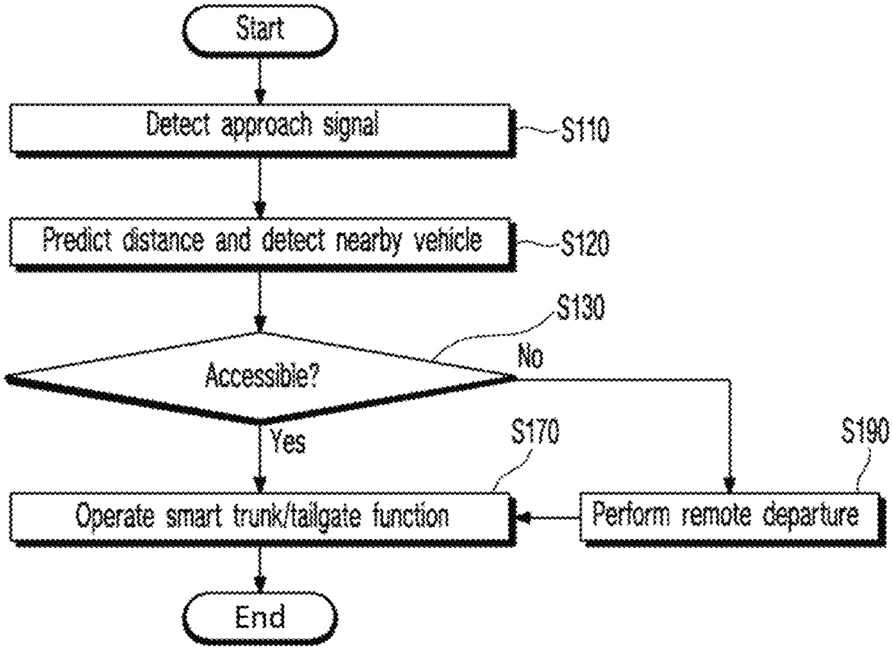
FIG. 2 is a flowchart illustrating a method of controlling an autonomous vehicle according to an embodiment of the present disclosure.

FIG. 2 is a flowchart illustrating a method of controlling an autonomous vehicle according to an embodiment of the present disclosure.

Referring to FIG. 2, according to an embodiment of the present disclosure, the autonomous vehicle 100 may operate as follows under the control of the processor 110.

The autonomous vehicle 100 may transmit or receive an approach signal using the communication module 150, under the control of the processor 110. The approach signal may be a signal generated from the digital key, the smart key 10, or an app installed on the smart device 20. For example, the approach signal may be transmitted to the autonomous vehicle 100 through CAN communication or the like, but examples are not limited thereto.

The app installed on the smart device 20 may be a connected car service (CCS) app, a Bluelink app, or the like. That the approach signal is received may indicate herein that a user carrying the digital key, the smart key 10, or the smart device 20 is gradually approaching the autonomous vehicle 100 which is parked and is predicted to reach the autonomous vehicle 100 after a predetermined time. The user may also be referred to herein as a driver or a passenger.

In operation S110, the autonomous vehicle 100 may activate a driver parking assist function upon receiving the approach signal, under the control of the processor 110.

In operation S120, in response to the driver parking assist function being activated, the autonomous vehicle 100 may sense the autonomous vehicle 100 and a surrounding situation of the autonomous vehicle 100 using the sensor 130, which is provided as at least one sensor, to generate sensor information, under the control of the processor 110.

The autonomous vehicle 100 may collect the generated sensor information and analyze the collected sensor information and the approach signal to predict a current location of the user, a distance between the user and the parked autonomous vehicle 100, and an estimated arrival time at which the user arrives at the autonomous vehicle 100, under the control of the processor 110.

In operation S130, by collecting the generated sensor information and analyzing the collected sensor information, the autonomous vehicle 100 may determine whether the user is accessible to a load space of the autonomous vehicle 100 or a space near the load space (or a surrounding space of the load space), under the control of the processor 110.

For example, when it is determined that, based on a result of the analysis of the collected sensor information, the user is accessible to the load space of the autonomous vehicle 100 or the space near the load space (or the surrounding space of the load space), the autonomous vehicle 100 may operate a smart trunk or tailgate based on the current location of the user, the distance between the user and the parked autonomous vehicle 100, the predicted estimated arrival time, the strength of the approach signal, or the like, under the control of the processor 110, in operation S170. This will be described in more detail with reference to various embodiments.

In contrast, when it is determined that, based on the result of the analysis of the collected sensor information, the user is inaccessible to the load space of the autonomous vehicle 100 or the space near the load space (or the surrounding space of the load space), the autonomous vehicle 100 may generate a request signal that requests a remote departure to move the autonomous vehicle 100 to a space in which the user is accessible to the load space of the autonomous vehicle 100 or a space accessible to the load space in the vicinity of the load space of the autonomous vehicle 100 (or the surrounding space of the load space of the autonomous vehicle 100), under the control of the processor 110, in operation S190.

The autonomous vehicle 100 may transmit the request signal to the user, and in response to a response signal to the transmitted request signal, may remotely depart the autonomous vehicle 100 to the space accessible to the load space of the autonomous vehicle 100, or may maintain a currently parked location without remotely departing the autonomous vehicle 100, under the control of the processor 110. This will be described in more detail below.

For example, when remotely departing the autonomous vehicle 100 to the space accessible to the load space of the autonomous vehicle 100 in response to the approach signal, the autonomous vehicle 100 may operate the smart trunk or tailgate based on the current location of the user, the distance between the user and the parked autonomous vehicle 100, the predicted estimated arrival time, the strength of the approach signal, or the like, under the control of the processor 110, in operation S170.

Figure 3:
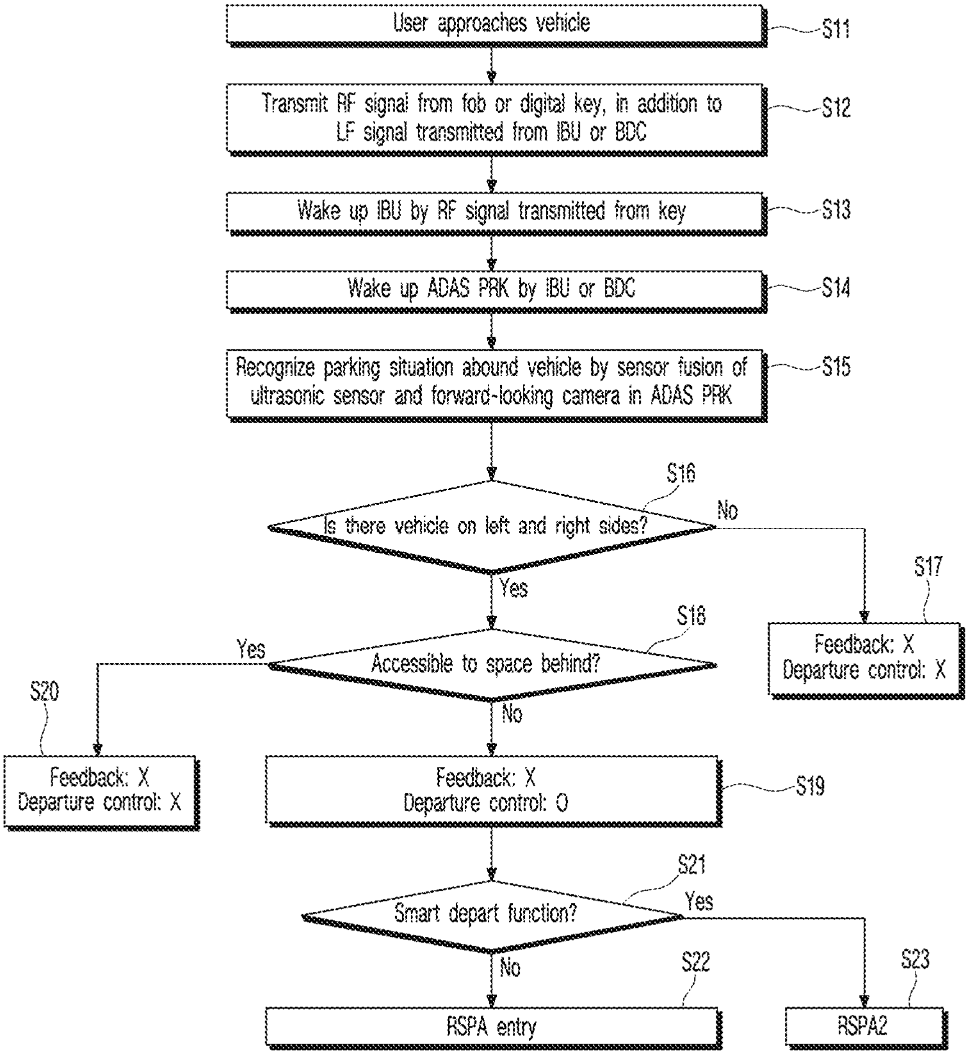
FIGS. 3, 4A and 4B are diagrams illustrating a method of controlling an autonomous vehicle according to a first embodiment of the present disclosure.
Figure 4A:
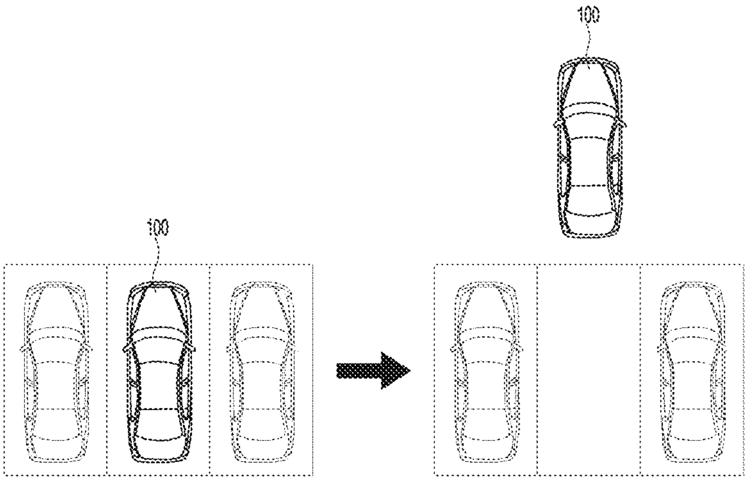
Figure 4B:
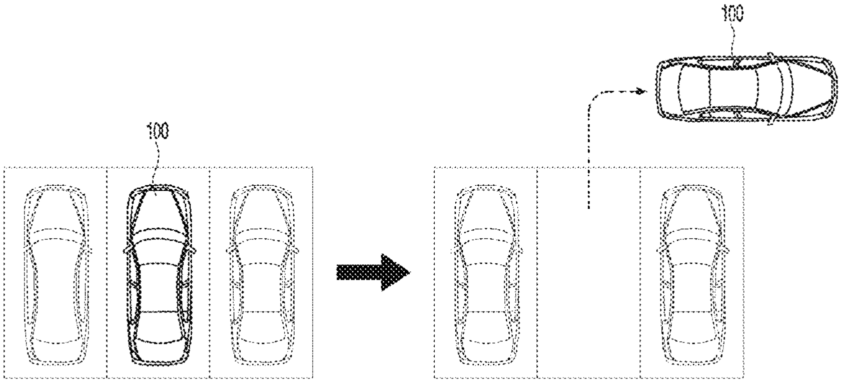

FIGS. 3, 4A, and 4B are diagrams illustrating a method of controlling an autonomous vehicle according to a first embodiment of the present disclosure.

Referring to FIG. 3, according to the first embodiment of the present disclosure, the autonomous vehicle 100 may operate as follows under the control of the processor 110. The autonomous vehicle 100 may also be referred to herein as an ego vehicle.

In operation S11, the user may move toward the autonomous vehicle 100. That is, the user may move toward the autonomous vehicle 100 while carrying the digital key or the smart key 10.

The autonomous vehicle 100 may receive an approach signal through the communication module 150, under the control of the processor 110, which may be in a low-power state or sleep state. For example, when the start of the autonomous vehicle 100 is turned off, an integrated body unit (IBU) (or body control unit (BDC)) may enter the low-power state or sleep state.

In the low-power state or sleep state, the IBU or BDC may transmit a low frequency (LF) signal to the outside of the autonomous vehicle 100. When the LF signal is received, the digital key or the smart key 10 may transmit a radio frequency (RF) signal in operation S12. The RF signal may also be referred to herein as an approach signal.

When the RF signal is received, the processor 110, which can be in the low-power state or sleep state, may be activated in operation S13. That is, the IBU or BDC may be switched from the low-power state or sleep state to an activated state (or wake-up state). For example, the IBU may be activated (or woken up) by the RF signal transmitted from the digital key or the smart key 10.

In operation S14, the autonomous vehicle 100 may activate, or wake up, a driver parking assist function, under the control of the activated processor 110. The driver parking assist function may include an advanced driver assistance system (ADAS) parking (PRK) function or an ADAS.

In operation S15, when the driver parking assist function is activated or woken up, the autonomous vehicle 100 may sense or detect a surrounding situation of the autonomous vehicle 100 using the sensor 130, under the control of the processor 110. For example, the autonomous vehicle 100 may recognize a parking situation around the autonomous vehicle 100 through a fused use of an ultrasonic sensor (e.g., 130) and a forward-looking camera sensor (e.g., 130), under the control of the processor 110.

In operation S16, the autonomous vehicle 100 may determine whether there is a parked vehicle on left and right sides of the autonomous vehicle 100, relative to the autonomous vehicle 100, based on the detected surrounding situation of the autonomous vehicle 100 or the recognized parking situation around the autonomous vehicle 100, under the control of the processor 110.

For example, when there is no parked vehicle on the left or right sides of the autonomous vehicle 100, the autonomous vehicle 100 may not provide feedback to the user, under the control of the processor 110, in operation S17. This can be because the user may be near the autonomous vehicle 100.

When there is no parked vehicle on the left or right sides of the autonomous vehicle 100, the user may be readily accessible to a load space, and thus the autonomous vehicle 100 may not control a departure of the autonomous vehicle 100, under the control of the processor 110, in operation S17.

Subsequently, in operation S18, the autonomous vehicle 100 may determine whether there is an accessible space behind the autonomous vehicle 100, relative to the autonomous vehicle 100, based on the detected surrounding situation of the autonomous vehicle 100 or the recognized parking situation around the autonomous vehicle 100, under the control of the processor 110. For example, the autonomous vehicle 100 may determine whether there is an accessible space available for a cart to enter behind the load space in a straight line, under the control of the processor 110.

In response to a determination that it is accessible to the load space, the autonomous vehicle 100 may not provide feedback to the user, under the control of the processor 110, in operation S20. This can be because the user may be sufficiently near the autonomous vehicle 100.

In response to the determination that it is accessible to the load space, the autonomous vehicle 100 may not control the departure of the autonomous vehicle 100, under the control of the processor 110, in operation S20. This can be because the user may be readily accessible to the load space.

In contrast, in response to a determination that it is inaccessible to the load space, the autonomous vehicle 100 may control the departure of the autonomous vehicle 100 without providing feedback to the user, under the control of the processor 110, in operation S19. This can be because the user is near the autonomous vehicle 100, and there is no need to provide feedback.

When a door (DR)/trunk/tailgate unlock signal (e.g., UNLOCK) is not received from the digital key or the smart key 10 for a predetermined time, the autonomous vehicle 100 may control the departure of the autonomous vehicle 100 under the control of the processor 110. In this case, the autonomous vehicle 100 may predict a current location of the user based on the sensitivity or strength of the received approach signal, and may set the predetermined time based on the predicted current location of the user, under the control of the processor 110.

For example, when the predicted current location of the user is in an area near or in the vicinity of the autonomous vehicle 100 and the DR/trunk/tailgate unlock signal is not received from the digital key or the smart key 10 for the predetermined time, the autonomous vehicle 100 may control the departure of the autonomous vehicle 100 after the predetermined time elapses, under the control of the processor 110.

By controlling the departure of the autonomous vehicle 100 after the predetermined time as described above, the autonomous vehicle 100 may improve the convenience between the autonomous vehicle 100 and the user and may also prevent items of the user loaded in the load space from being stolen or lost.

However, examples are not necessarily limited to the preceding, and the autonomous vehicle 100 may use an infosystem under the control of the processor 110. For example, when the infosystem is activated or woken up, the autonomous vehicle 100 may attempt an automatic connection to find a smart device (e.g., the smart device 20) having a history of being connected through Bluetooth before, and perform the automatic connection when the smart device 20 with the history approaches within a detection range (e.g., 10 meters (m)), under the control of the processor 110.

When the autonomous vehicle 100 is automatically connected to the smart device 20 within the detection range through Bluetooth, the autonomous vehicle 100 may use this as a trigger to remotely depart the autonomous vehicle 100, under the control of the processor 110. The detection range may include an area near or in the vicinity of the autonomous vehicle 100.

In operation S21, the autonomous vehicle 100 may control the departure of the autonomous vehicle 100 differently according to a smart depart function, under the control of the processor 110.

As shown in FIGS. 4A and 4B, a departure method may include RSPA2 or RSPA entry. For example, as shown in FIG. 4A, in a case where the departure method is RSPA entry in operation S22, the autonomous vehicle 100, which is a vehicle of a user, may travel straight to a location where at least 1 m is secured for a space between the autonomous vehicle 100 and a parked vehicle or object on its left and rights, and may then stop. The autonomous vehicle 100 may brake when detecting an obstacle therearound while traveling, under the control of the processor 110.

In contrast, as shown in FIG. 4B, in a case where the departure method is RSPA2 in operation S23, the autonomous vehicle 100 may depart in a direction parallel to a parking space. The autonomous vehicle 100 may brake when detecting an obstacle therearound while traveling, under the control of the processor 110.

As described above, the autonomous vehicle 100 may remotely depart the autonomous vehicle 100 from the parking space using the function of RSPA or RSPA entry, under the control of the processor 110.

Subsequently, the autonomous vehicle 100 may operate a smart trunk/tailgate, under the control of the processor 110.

Figure 5:
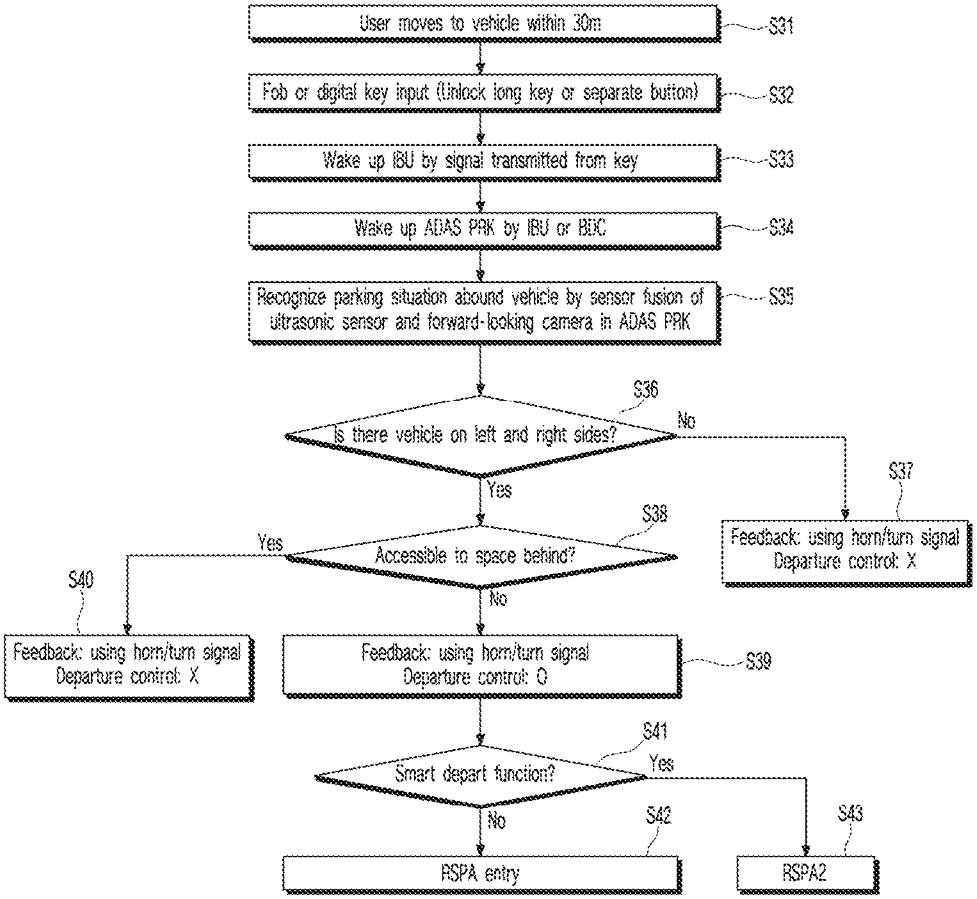
FIG. 5 is a flowchart illustrating a method of controlling an autonomous vehicle according to a second embodiment of the present disclosure.

FIG. 5 is a flowchart illustrating a method of controlling an autonomous vehicle according to a second embodiment of the present disclosure.

Referring to FIG. 5, according to the second embodiment of the present disclosure, the autonomous vehicle 100 may operate as follows under the control of the processor 110.

In operation S31, the user may move toward the autonomous vehicle 100 within a predetermined remote distance. That is, the user may move toward the autonomous vehicle 100 while carrying the digital key, the smart key 10, or the smart device 20 on which a CCS app (or Bluelink app) is installed, within the remote distance.

In operation S32, while moving to the autonomous vehicle 100, the user may generate an approach signal using the digital key, the smart key 10, or the smart device 20 on which the CCS app (or Bluelink app) is installed. For example, the digital key, the smart key 10, or the smart device 20 on which the CCS app (or Bluelink app) is installed may generate an LF signal by clicking a long key of Unlock or a separate button, and transmit the generated LF signal. The approach signal may be the autonomous vehicle 100 signal.

The autonomous vehicle 100 may receive the approach signal through the communication module 150, under the control of the processor 110, which can be in a low-power state or sleep state.

For example, when the start of the autonomous vehicle 100 is turned off, the IBU or BDC may enter the low-power state or sleep state.

In the low-power state or sleep state, the IBU or BDC may transmit the LF signal to the outside of the autonomous vehicle 100. In response to the LF signal being received, the digital key, the smart key 10, or the smart device 20 on which the CCS app (or Bluelink app) is installed may transmit an RF signal. The RF signal may also be referred to as the approach signal.

In operation S33, in response to the RF signal being received, the processor 110, which can be in the low-power state or sleep state, may be activated. That is, the IBU or BDC may be switched from the low-power state or sleep state to an activated state (or wake-up state). For example, the IBU may be activated or woken up by the RF signal transmitted from the smart key 10.

In operation S34, the autonomous vehicle 100 may activate, or wake up, a driver parking assist function, under the control of the activated processor 110. The driver parking assist function may include an ADAS PRK function or an ADAS.

In operation S35, when the driver parking assist function is activated or woken up, the autonomous vehicle 100 may sense or detect a surrounding situation of the autonomous vehicle 100 using the sensor 130, under the control of the processor 110. For example, the autonomous vehicle 100 may recognize a parking situation around the autonomous vehicle 100 through a fused use of an ultrasonic sensor (e.g., 130) and a forward-looking camera sensor (e.g., 130), under the control of the processor 110.

In operation S36, the autonomous vehicle 100 may determine whether there is a parked vehicle on left and right sides of the autonomous vehicle 100, relative to the autonomous vehicle 100, based on the detected surrounding situation of the autonomous vehicle 100 or the recognized parking situation around the autonomous vehicle 100, under the control of the processor 110.

For example, when there is no parked vehicle on the left or right sides of the autonomous vehicle 100, the autonomous vehicle 100 may provide feedback to the user, using a horn/turn signal flickering, under the control of the processor 110, in operation S37. The autonomous vehicle 100 may provide feedback to the user using the horn/turn signal to notify the user that there is no parked vehicle around the autonomous vehicle 100, under the control of the processor 110.

When there is no parked vehicle on the left or right sides of the autonomous vehicle 100, the user may be readily accessible to a load space, and thus the autonomous vehicle 100 may not control a departure of the autonomous vehicle 100, under the control of the processor 110, in operation S37.

In operation S38, the autonomous vehicle 100 may determine whether there is an accessible space behind the autonomous vehicle 100, relative to the autonomous vehicle 100, based on the detected surrounding situation of the autonomous vehicle 100 or the recognized parking situation around the autonomous vehicle 100, under the control of the processor 110. For example, the autonomous vehicle 100 may determine whether there is an accessible space available for a cart to enter behind the load space in a straight line, under the control of the processor 110. When a distance between the autonomous vehicle 100 and a vehicle parked therearound is at least 600 mm or greater based on a horizontal width, the processor 110 may determine that there is an accessible space available for the cart to enter. The processor 110 may then provide feedback on the accessible space to the user using the horn/turn signal flickering in operation S40.

In response to a determination that it is accessible to the load space, the user may be readily accessible to the load space, and thus the autonomous vehicle 100 may not control the departure of the autonomous vehicle 100, under the control of the processor 110, in operation S40.

In contrast, in response to a determination that it is inaccessible to the load space, the autonomous vehicle 100 may provide feedback that it is inaccessible to the load space to the user using the horn/turn signal flickering, under the control of the processor 110, in operation S39.

The processor 110 may use the horn/turn signal flickering, but may output differently, when there is no parked vehicle, when there is an accessible space, and when it is inaccessible to the load space. Using the horn/turn signal flickering, but outputting differently in this way, may allow the user to recognize the surrounding situation clearly.

When a DR/trunk/tailgate unlock signal (e.g., UNLOCK) is not received from the digital key or the smart key 10 for a predetermined time, the autonomous vehicle 100 may control the departure of the autonomous vehicle 100 under the control of the processor 110. In this case, the autonomous vehicle 100 may predict a current location of the user based on the sensitivity or strength of the received approach signal, and may set the predetermined time based on the predicted current location of the user, under the control of the processor 110.

For example, when the predicted current location of the user is in an area near or in the vicinity of the autonomous vehicle 100 and the DR/trunk/tailgate unlock signal is not received from the digital key or the smart key 10 for the predetermined time, the autonomous vehicle 100 may control the departure of the autonomous vehicle 100 after the predetermined time elapses, under the control of the processor 110.

By controlling the departure of the autonomous vehicle 100 after the predetermined time as described above, the autonomous vehicle 100 may improve the convenience between the autonomous vehicle 100 and the user and may also prevent items of the user loaded in the load space from being stolen or lost.

However, examples are not necessarily limited to the preceding, and the autonomous vehicle 100 may use an infosystem under the control of the processor 110. For example, when the infosystem is activated or woken up, the autonomous vehicle 100 may attempt an automatic connection to find a smart device (e.g., the smart device 20) having a history of being connected through Bluetooth before, and perform the automatic connection when the smart device 20 with the history approaches within a detection range (e.g., 10 m), under the control of the processor 110.

When the autonomous vehicle 100 is automatically connected to the smart device 20 within the detection range through Bluetooth, the autonomous vehicle 100 may use this as a trigger to remotely depart the autonomous vehicle 100, under the control of the processor 110. The detection range may include an area near or in the vicinity of the autonomous vehicle 100.

In operation S41, the autonomous vehicle 100 may control the departure of the autonomous vehicle 100 differently according to a smart depart function, under the control of the processor 110. The departure method may include RSPA2 (e.g., operation S43) or RSPA entry (e.g., operation S42), which is described above with reference to FIG. 4, and a detailed description will be omitted here for brevity.

Figure 6:
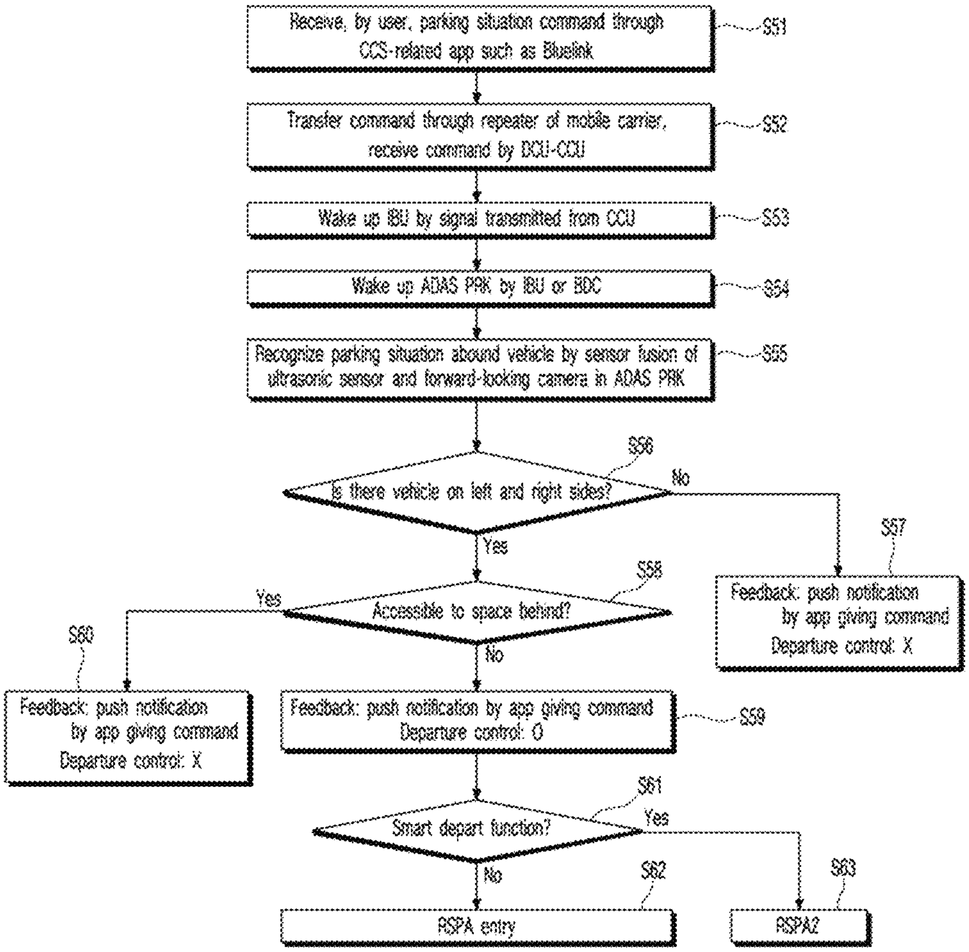
FIG. 6 is a flowchart illustrating a method of controlling an autonomous vehicle according to a third embodiment of the present disclosure.

FIG. 6 is a flowchart illustrating a method of controlling an autonomous vehicle according to a third embodiment of the present disclosure.

Referring to FIG. 6, according to the third embodiment of the present disclosure, the autonomous vehicle 100 may operate as follows under the control of the processor 110.

In operation S51, the user may transmit an approach signal using the smart device 20 on which a CCS app (or Bluelink app) is installed. For example, the user may operate the CCS app (or Bluelink app) installed on the smart device 20 while moving to the autonomous vehicle 100. The smart device 20 may generate the approach signal and transmit the generated approach signal, using the CCS app (or Bluelink app). In this case, the approach signal may be a command signal related to a parking situation around the autonomous vehicle 100.

In operation S52, the autonomous vehicle 100 may receive the approach signal through the communication module 150, under the control of the processor 110, which can be in a low-power state or sleep state. In this case, the approach signal may be provided to the communication module 150 using a repeater of a mobile carrier. The processor 110 may receive the approach signal through the communication module 150. The processor 110 may include a connectivity control unit (CCU), a domain control unit (DCU), or the like.

In operation S53, in response to the approach signal being received, the processor 110, which can be in the low-power state or sleep state, may be activated. That is, the IBU or BDC may be switched from the low-power state or sleep state to an activated state (or wake-up state) by a wake-up system. For example, the IBU may be woken up by the approach signal provided by the CCU.

Subsequently, in operation S54, the autonomous vehicle 100 may activate, or wake up, a driver parking assist function, under the control of the activated processor 110. The driver parking assist function may include an ADAS PRK function or an ADAS.

In operation S55, when the driver parking assist function is activated or woken up, the autonomous vehicle 100 may sense or detect a surrounding situation of the autonomous vehicle 100 using the sensor 130, under the control of the processor 110. For example, the autonomous vehicle 100 may wake up the driver parking assist function under the control of the processor 110, but maintain the wake-up state for a first time period, which can be a set, selected, or predetermined time. In this case, after the first time period elapses, the autonomous vehicle 100 may switch the wake-up state to a deactivated state or sleep state, and may then maintain the wake-up state again for the first time period. That is, the autonomous vehicle 100 may operate the wake-up state and the sleep state of the driver parking assist function repeatedly, under the control of the processor 110. For example, the first time period may be, but is not limited to, approximately 10 minutes.

This can be because, when the driver parking assist function is continuously activated (woken up) while a current location of the user is unknown, a battery of the autonomous vehicle 100 may be unnecessarily drained. That is, the driver parking assist function may be activated for a predetermined period of time to prevent an unnecessary drain on the battery of the autonomous vehicle 100.

When the driver parking assist function is activated or woken up, the autonomous vehicle 100 may recognize a parking situation around the autonomous vehicle 100 through a fused use of an ultrasonic sensor (e.g., 130) and a forward-looking camera sensor (e.g., 130) (i.e., fusion of sensor data from multiple sensors), under the control of the processor 110.

In operation S56, the autonomous vehicle 100 may determine whether there is a parked vehicle on left and right sides of the autonomous vehicle 100, relative to the autonomous vehicle 100, based on the detected surrounding situation of the autonomous vehicle 100 or the recognized parking situation around the autonomous vehicle 100, under the control of the processor 110.

For example, when there is no parked vehicle on the left or right sides of the autonomous vehicle 100, the autonomous vehicle 100 may provide feedback to the user by providing a push notification to the CCS app that has generated the approach signal, under the control of the processor 110, in operation S57.

Under the control of the processor 110, the autonomous vehicle 100 may first provide the push notification to the CCS app that has generated the approach signal. After this, the autonomous vehicle 100 may not provide the push notification when the surrounding situation of the autonomous vehicle 100 does not change, and may provide an N-th push notification to the CCS app only when the surrounding situation of the autonomous vehicle 100 changes. For example, N can be a natural number greater than or equal to 2.

When there is no parked vehicle on the left or right sides of the autonomous vehicle 100, the user may be readily accessible to a load space, and thus the autonomous vehicle 100 may not control a departure of the autonomous vehicle 100, under the control of the processor 110, in operation S57.

In operation S58, the autonomous vehicle 100 may determine whether there is an accessible space behind the autonomous vehicle 100, relative to the autonomous vehicle 100, based on the detected surrounding situation of the autonomous vehicle 100 or the recognized parking situation around the autonomous vehicle 100, under the control of the processor 110. For example, the autonomous vehicle 100 may determine whether there is an accessible space available for a cart to enter behind the load space in a straight line, under the control of the processor 110.

When a distance between the autonomous vehicle 100 and a vehicle parked therearound is at least 600 mm or greater based on a horizontal width, for example, the processor 110 may determine that there is an accessible space available for the cart to enter. The processor 110 may then provide feedback to the user by providing information about the accessible space to the CCS app, in operation S60.

In response to a determination that it is accessible to the load space, the user may be readily accessible to the load space, and thus the autonomous vehicle 100 may not control the departure of the autonomous vehicle 100, under the control of the processor 110, in operation S60.

In contrast, in response to a determination that the load space is inaccessible, the autonomous vehicle 100 may provide feedback that the load space is inaccessible to the user by providing the information about an accessible space to the CCS app, under the control of the processor 110, in operation S59.

The autonomous vehicle 100 may use an infosystem under the control of the processor 110. For example, when the infosystem is activated or woken up, the autonomous vehicle 100 may attempt an automatic connection to find a smart device (e.g., the smart device 20) having a history of being connected through Bluetooth before, and perform the automatic connection when the smart device 20 with the history approaches within a detection range (e.g., 10 m), under the control of the processor 110. When it is automatically connected to the smart device 20 within the detection range through Bluetooth, the autonomous vehicle 100 may predict a current location of the user, under the control of the processor 110.

When it is automatically connected to the smart device 20 within the detection range through Bluetooth, the autonomous vehicle 100 may use this as a trigger to remotely depart the autonomous vehicle 100, under the control of the processor 110, in operation S59.

When a DR/trunk/tailgate unlock signal (e.g., UNLOCK) is not received from the digital key, the smart key 10, or the CCS app for a first time period, which can be a set, selected, or a predetermined time, the autonomous vehicle 100 may control the departure of the autonomous vehicle 100 under the control of the processor 110. In this case, the autonomous vehicle 100 may predict the current location of the user based on the sensitivity or strength of the received approach signal, and may set the first time period based on the predicted current location of the user, under the control of the processor 110.

For example, when the predicted current location of the user is in an area near or in the vicinity of the autonomous vehicle 100 and the DR/trunk/tailgate unlock signal is not received from the digital key, the smart key 10, or the CCS app for the a first time period, the autonomous vehicle 100 may control the departure of the autonomous vehicle 100 after the first time period elapses, under the control of the processor 110.

By controlling the departure of the autonomous vehicle 100 after the first time period as described above, the autonomous vehicle 100 may improve the convenience between the autonomous vehicle 100 and the user and may also prevent items of the user loaded in the load space from being stolen or lost.

The autonomous vehicle 100 may control the departure of the autonomous vehicle 100 differently according to a smart depart function, under the control of the processor 110, in operation S61. The departure method may include RSPA2 (e.g., operation S63) or RSPA entry (e.g., operation S62), which is described above with reference to FIG. 4, and a detailed description will be omitted here for brevity.

Figure 7:
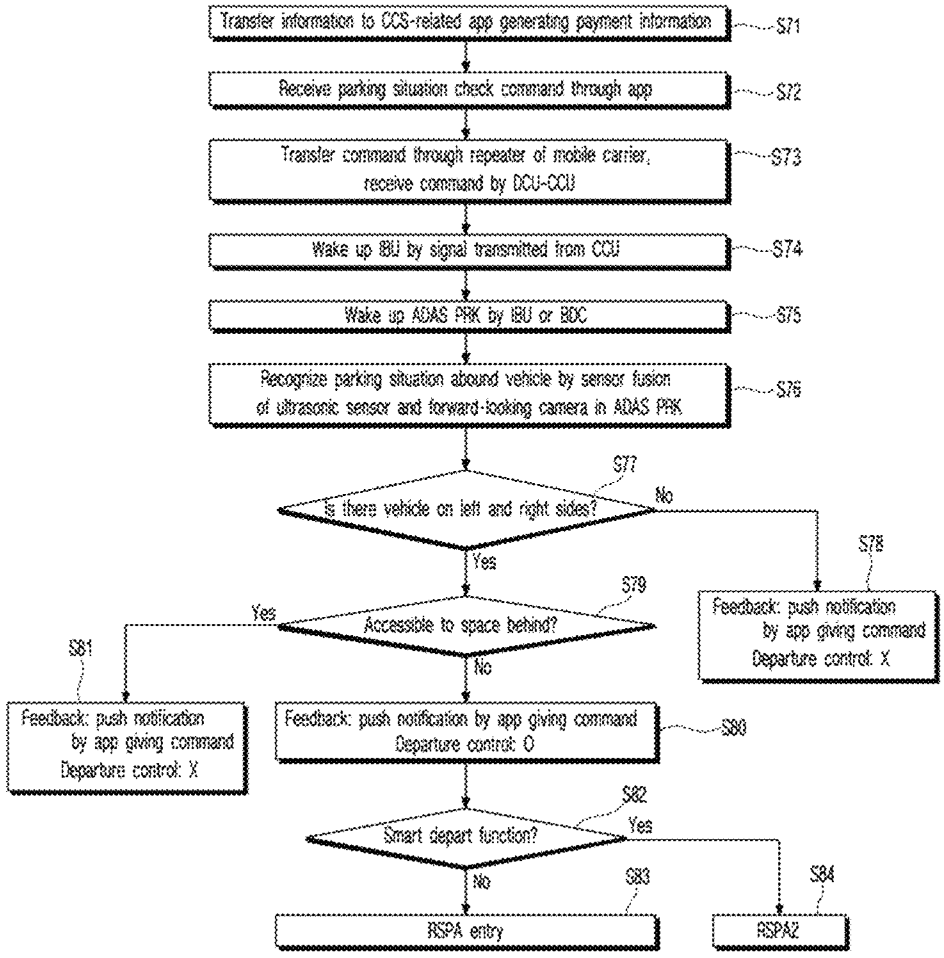
FIG. 7 is a flowchart illustrating a method of controlling an autonomous vehicle according to a fourth embodiment of the present disclosure.

FIG. 7 is a flowchart illustrating a method of controlling an autonomous vehicle according to a fourth embodiment of the present disclosure.

Referring to FIG. 7, according to the fourth embodiment of the present disclosure, the autonomous vehicle 100 may operate as follows under the control of the processor 110.

In operation S71, when the smart device 20 on which a CCS app (or Bluelink app) is installed receives payment information of a user from an external source, the smart device 20 may transfer the received payment information to the CCS app.

In operation S72, the smart device 20 may generate an approach signal using the CCS app (or the Bluelink app) and transmit the generated approach signal. In this case, the approach signal may be a command signal related to a parking situation around the autonomous vehicle 100.

In operation S73, the autonomous vehicle 100 may receive the approach signal through the communication module 150, under the control of the processor 110, which can be in a low-power state or sleep state. In this case, the approach signal may be provided to the communication module 150 using a repeater of a mobile carrier. The processor 110 may receive the approach signal through the communication module 150.

The following description is substantially the same as described above with reference to FIG. 6 and will therefore be brief.

When the approach signal is received, the processor 110, which is in the low-power state or sleep state, may be activated in operation S74.

Subsequently, the autonomous vehicle 100 may activate, or wake up, a driver parking assist function, under the control of the activated processor 110, in operation S75.

The autonomous vehicle 100 may wake up the driver parking assist function and detect or sense a surrounding situation of the autonomous vehicle 100 using the sensors 130, under the control of the processor 110, in operation S76.

The autonomous vehicle 100 may determine whether there is a parked vehicle on left and right sides of the autonomous vehicle 100, relative to the autonomous vehicle 100, based on the detected surrounding situation of the autonomous vehicle 100 or the recognized parking situation around the autonomous vehicle 100, under the control of the processor 110, in operation S77.

For example, when there is no parked vehicle on the left or right sides of the autonomous vehicle 100, the autonomous vehicle 100 may provide feedback to the user by providing a push notification to the CCS app that has generated the approach signal, and may not control the departure of the autonomous vehicle 100, under the control of the processor 110, in operation S78.

In operation S79, the autonomous vehicle 100 may determine whether there is an accessible space behind the autonomous vehicle 100, relative to the autonomous vehicle 100, based on the detected surrounding situation of the autonomous vehicle 100 or the recognized parking situation around the autonomous vehicle 100, under the control of the processor 110.

In response to a determination that the load space is accessible, the user may be readily accessible to the load space, and thus the autonomous vehicle 100 may not control the departure of the autonomous vehicle 100, under the control of the processor 110, in operation S81.

In contrast, in response to a determination that the load space is inaccessible, the autonomous vehicle 100 may provide feedback that the load space is inaccessible to the user by providing information about an accessible space to the CCS app, and control the departure of the autonomous vehicle 100, under the control of the processor 110, in operation S80.

The autonomous vehicle 100 may control the departure of the autonomous vehicle 100 differently according to a smart depart function, under the control of the processor 110, in operation S82. The departure method may include RSPA2 (e.g., operation S84) or RSPA entry (e.g., operation S83).

The example embodiments of the present disclosure described herein may be implemented as computer-readable code on a storage medium in which a program is recorded. The computer-readable medium may include all types of recording devices that store data to be read by a computer system. The computer-readable medium may include, for example, a hard disk drive (HDD), a solid-state drive (SSD), a silicon disk drive (SDD), a read-only memory (ROM), a random-access memory (RAM), a compact disc ROM (CD-ROM), a magnetic tape, a floppy disk, an optical data storage device, or the like.

Accordingly, the preceding detailed description should not be construed as necessarily restrictive but as illustrative. The scopes of potential embodiments of the present disclosure can be determined by reasonable interpretation of the appended claims, and all changes and modifications within equivalent scopes of the present disclosure can be included in the scopes of the present disclosure.

What is claimed is:

1. A method of controlling an autonomous vehicle comprising a processor, the method comprising:

under control of the processor and in response to an approach signal being received through a communication module, activating a driver parking assist function;

under control of the processor and in response to the driver parking assist function being activated, detecting a surrounding situation of the autonomous vehicle using a sensor and determining whether a load space at the autonomous vehicle is accessible;

under control of the processor, determining whether a door, trunk, or tailgate unlock signal is received from a digital key or a smart key during a first period of time; and under control of the processor, moving the autonomous vehicle based on determining that the load space is inaccessible and determining that the door, trunk, or tailgate unlock signal is not received during the first period of time.

2. The method of claim 1, wherein the activating of the driver parking assist function comprises:

in response to the approach signal being received, activating the processor being in from a low-power state or a sleep state; and activating, by the processor, the driver parking assist function after the activating of the processor.

3. The method of claim 2, further comprising:

under the control of the processor and after the driver parking assist function is activated, detecting the surrounding situation of the autonomous vehicle and generating sensor information, using the sensor;

under the control of the processor, determining whether there are one or more vehicles parked on left and right sides of the autonomous vehicle relative to the autonomous vehicle, by analyzing the sensor information; and under the control of the processor and in response to there being no vehicle parked on the left and right sides of the autonomous vehicle, not providing feedback to a user or not controlling a departure of the autonomous vehicle.

4. The method of claim 3, further comprising:

under the control of the processor and in response to there being one or more vehicles parked on the left and right sides of the autonomous vehicle, determining whether the autonomous vehicle is accessible at a space behind the autonomous vehicle; and under the control of the processor and in response to the autonomous vehicle being accessible at the space behind the autonomous vehicle, not providing feedback to the user or not controlling the departure of the autonomous vehicle.

5. The method of claim 4, further comprising, under the control of the processor and in response to the autonomous vehicle being inaccessible at the space behind the autonomous vehicle, controlling the departure of the autonomous vehicle.

6. The method of claim 5, further comprising, under the control of the processor and in response to a wireless connection between the communication module of the autonomous vehicle and a smart device owned by the user, determining that the user is within a detection range and controlling the departure of the autonomous vehicle.

7. The method of claim 5, further comprising, under the control of the processor, controlling a departure method for the autonomous vehicle differently based on a smart depart function installed on the autonomous vehicle.

8. The method of claim 5, further comprising:

receiving, from a smart device of the user, payment information of the user;

generating the approach signal in response to receiving the payment information; and transmitting the approach signal from the smart device of the user to the communication module.

9. The method of claim 1, further comprising:

under the control of the processor, generating sensor information by detecting the surrounding situation of the autonomous vehicle using the sensor; and under the control of the processor, predicting a current location of a user, a distance between the user and the autonomous vehicle, and an estimated arrival time at which the user arrives at the autonomous vehicle by analyzing the sensor information and the approach signal.

10. A non-transitory computer-readable recording medium storing a program for executing a method of controlling an autonomous vehicle, the method comprising:

in response to an approach signal being received through a communication module, activating a driver parking assist function;

in response to the driver parking assist function being activated, detecting a surrounding situation of the autonomous vehicle using a sensor and determining whether a load space at the autonomous vehicle is accessible;

determining whether a door, trunk, or tailgate unlock signal is received from a digital key or a smart key during a first period of time; and moving the autonomous vehicle based on the load space being inaccessible and the door, trunk, or tailgate unlock signal not being received during the first period of time.

11. An autonomous vehicle comprising:

a communication module;

a sensor;

one or more processors; and a storage medium storing computer-readable instructions that, when executed by the one or more processors, enable the one or more processors to:

in response to an approach signal being received through the communication module, activate a driver parking assist function;

in response to the driver parking assist function being activated, detect a surrounding situation of the autonomous vehicle using the sensor and determine whether a load space at the autonomous vehicle is accessible;

determine whether a door, trunk, or tailgate unlock signal is received from a digital key or a smart key during a first period of time; and move the autonomous vehicle in response to the load space being inaccessible and the door, trunk, or tailgate unlock signal not being received during the first period of time.

12. The autonomous vehicle of claim 11, further comprising a wakeup system configured to activate the one or more processors being in a low-power state or a sleep state, in response to the approach signal being received by the communication module; and wherein the instructions further enable the one or more processors to activate the driver parking assist function after the activating of the one or more processors.

13. The autonomous vehicle of claim 12, wherein the instructions further enable the one or more processors to:

after the driver parking assist function is activated, detect the surrounding situation of the autonomous vehicle and generate sensor information using sensor signals from the sensor;

determine whether there are one or more vehicles parked on left and right sides of the autonomous vehicle relative to the autonomous vehicle, by analyzing the sensor information; and in response to there being no vehicle parked on the left and right sides of the autonomous vehicle, not provide feedback to a user or not control a departure of the autonomous vehicle.

14. The autonomous vehicle of claim 13, wherein the instructions further enable the one or more processors to:

in response to there being one or more vehicles parked on the left and right sides of the autonomous vehicle, determine whether a space behind the autonomous vehicle is accessible; and in response to the space behind the autonomous vehicle being accessible, not provide feedback to the user or not control the departure of the autonomous vehicle.

15. The autonomous vehicle of claim 14, wherein the instructions further enable the one or more processors to, in response to the space behind the autonomous vehicle being inaccessible, control the departure of the autonomous vehicle.

16. The autonomous vehicle of claim 15, wherein the instructions further enable the one or more processors to, in response to a wireless connection between the communication module of the autonomous vehicle and a smart device owned by the user, determine that the user is within a detection range and control the departure of the autonomous vehicle.

17. The autonomous vehicle of claim 15, wherein the instructions further enable the one or more processors to control a departure method for the autonomous vehicle differently based on a smart depart function installed on the autonomous vehicle.

18. The autonomous vehicle of claim 15, wherein the approach signal is transmitted from a smart device of the user to the communication module, and wherein the smart device of the user receives payment information of the user and generates the approach signal in response to receiving the payment information.

19. The autonomous vehicle of claim 11, wherein the instructions further enable the one or more processors to:

generate sensor information by detecting the surrounding situation of the autonomous vehicle using sensor signals from the sensor; and predict a current location of a user, a distance between the user and the autonomous vehicle, and an estimated arrival time at which the user arrives at the autonomous vehicle by analyzing the sensor information and the approach signal.

20. The autonomous vehicle of claim 11, wherein the instructions further enable the one or more processors to provide feedback, regarding whether the load space at the autonomous vehicle is accessible, to a user with a communication signal sent wirelessly via the communication module.

* * * * *